H. WATKEYS.

Valve Seats for Steam Cylinders.

No. 9,386. Reissued Sept. 21, 1880.

WITNESSES:

Wm. C. Raymond.

E. Laass

INVENTOR:

Henry Watkeys per Dull, Laass & Hey attorneys

N. PETERS, PHOTO-LITHOGRAPHER, WASHINGTON, D. C.

UNITED STATES PATENT OFFICE.

HENRY WATKEYS, OF SYRACUSE, NEW YORK.

VALVE-SEAT FOR STEAM-CYLINDERS.

SPECIFICATION forming part of Reissued Letters Patent No. 9,386, dated September 21, 1880.

Original No. 210,279, dated November 26, 1878. Application for reissue filed July 15, 1880.

*To all whom it may concern:*

Be it known that I, HENRY WATKEYS, of Syracuse, in the county of Onondaga, in the State of New York, have invented new and useful Improvements in Valve-Seats for Steam-Cylinders, of which the following, taken in connection with the accompanying drawings, is a full, clear, and exact description.

This invention relates more particularly to the cylinder face or seat for reciprocating or so-called "slide-valves" of steam-engines, the object of the invention being to provide the cylinder with a face or valve-seat which shall be readily attached and detached, and thus capable of being redressed or refaced with great facility and at a materially reduced expense, and when worn out readily substituted by a new one, and, furthermore, shall be adjustable in its position; and it consists, essentially, of a plate or diaphragm provided with the requisite steam induction and eduction ports and mounted loose on the cylinder inside of the steam-chest, substantially in the manner hereinafter more fully described.

Figure 2:
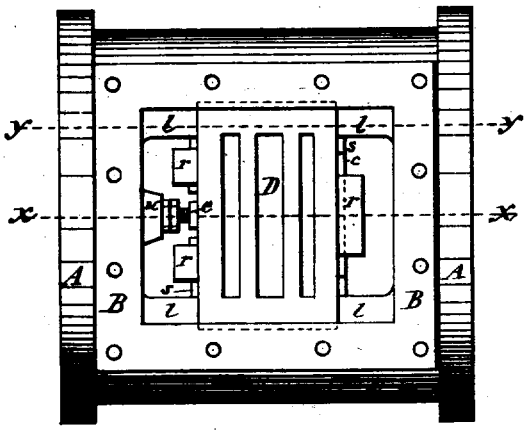
Figure 1:
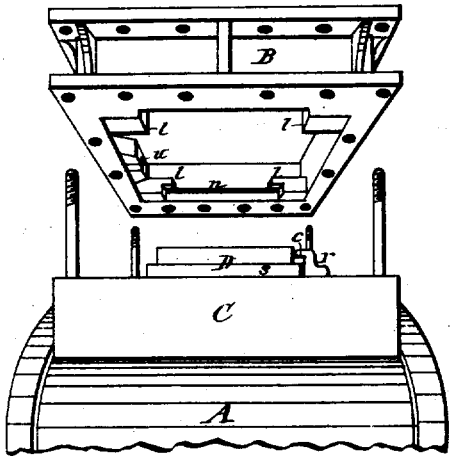
Figure 3:
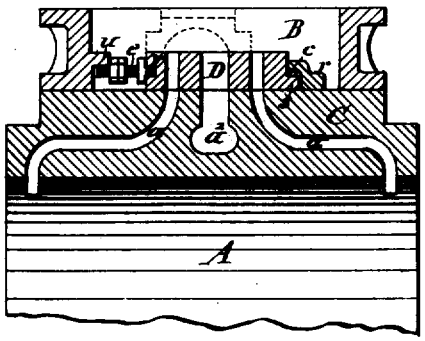

In the accompanying drawings, Figure 1 is a perspective side view of a steam-chest detached from the cylinder to show my improvements. Fig. 2 is a top view of a steam-chest and cylinder provided with my improvements; Fig. 3, a longitudinal section on line *x x* in Fig. 2, and Fig. 4 a longitudinal section on line *y y* in Fig. 2.

Similar letters of reference indicate corresponding parts.

A represents the steam-cylinder, and B the steam-chest, of a reciprocating engine. The top of the cylinder is usually cast with a saddle or a horizontal bed, C, of sufficient height to contain internally the exhaust-port *a'* and steam-channels *a*, by which latter the cylinder communicates with the steam-chest mounted on the bed C.

New cylinders are usually cast with a raised face inside of the steam-chest, which face is planed down to form a true bearing or seat for the valve which slides thereon. The friction and abrasion resultant from the movement of the valve necessitate frequent redressing and refacing of the valve-seat, and this operation has, on account of the inconvenience of access to the valve-seat, generally been accomplished either by a portable planer mounted on the cylinder or by chipping and filing. Either of the said methods, however, requires the removal of the steam-chest studs, and is therefore expensive, especially the latter, by the extra time and the amount of files consumed in the operation.

Figure 4:
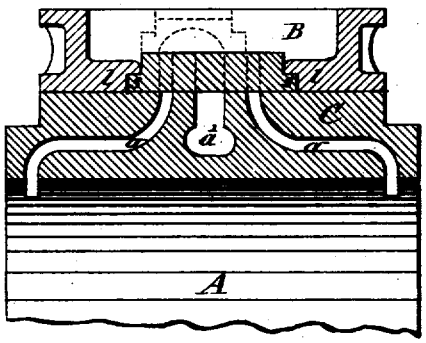

The repeated refacing of the valve-seat, as aforesaid, reduces the said seat to the level of the bed C, as shown in Figs. 3 and 4 of the drawings, and eventually to such an extent as to necessitate either a renewal of the cylinder or the application of a false seat. This latter remedy was attained by rigidly bolting onto the cylinder-face a plate having ports corresponding with those of the cylinder-face. This false seat was refaced in the same manner as the original seat, according to the wear, and when worn out it was renewed so long as it was practicable. This rigidly bolting of the false seat to the cylinder has many objectionable features, and in many instances proved a source of heavy and expensive damages to the engine. The said confinement of the seat prevents it from expanding and contracting under the variations of heat it is subjected to, and causes the central or intermediate portion thereof, when heated, to warp and spring away from the cylinder-face, thereby producing vents between the steam and exhaust ports underneath the false-seat, and the consequent waste of steam. Frequently the aforesaid strain on the false-seat causes the fastening-bolts thereof to break or work loose and interfere with the working of the valve, generally resulting in breaking the valve-seat, valve-yoke, and parts connected therewith, and such bolts as remain intact become so corroded and fixed in their hold in the cylinder as to render it very difficult to detach the aforesaid false-seat when required to be removed. Furthermore, the refacing of a valve-seat fixed in its position on the cylinder necessitates the extra time and labor of removing the studs of the steam-chest in order to obtain room for the performance of the refacing operation. It is to obviate these difficulties, and to a great extent their attending expense, which my invention has for its object; and to this end I form the valve-seat of a plate, D, provided with the requisite steam and exhaust ports, which plate I mount loose on the cylinder-face inside of the steam-chest and secure it in position by shoulders or lugs, either on the cylinder-face or sides and ends of the steam-chest.

When my invention is to be applied to the old style of steam-chests I either bolt to the cylinder-face, at opposite ends of the loose valve-seat D, flanged lugs or ribs *r r*, which engage with a flange, *s*, on the base of the valve-seat, which latter is inserted endwise between said ribs, or I provide the valve-seat with extensions at its corners of proper length to abut against opposite ends of the steam-chest when heated and expanded.

With new cylinders and new steam-chests I either cast the ribs *r* on the cylinder-face or cast on the inside corners of the steam-chest lugs or stays *l* of proper length to abut against the ends of the loose valve-seat D. Any misfit causing excessive play between the engaging parts before described can be remedied by a key, *c*, inserted between said parts. In order to brace the central portion of the valve-seat, I provide the sides of the steam-chest with a shoulder, *n*, on the interior, underneath which passes the flange *s*, extended around the sides of the valve-seat. The valve-seat D is to be fitted with sufficient play at its sides and ends to make due allowance for expansion of said seat when heated, and thus prevent binding or cramping and the resultant leakage of steam underneath the same, as is the case with the false-seats heretofore bolted onto the cylinder-face. The function of the overlapping part of all the described lugs and shoulders is merely to prevent the valve-seat from being lifted by back-pressure of steam incident to the reversing of the engine while in motion. Experience has proved that normally the pressure of steam in the steam-chest is sufficient to hold the valve-seat steam-tight upon the cylinder-face.

To compensate for any variations which may occur in the size of the interchanged valve seat I arrange between one end of the valve-seat and the adjacent end of the steam-chest a set-screw, *e*, or key, by means of which a misfitted valve-seat can be adjusted and secured in its proper position. To prevent the set-screw, in case of its working loose, becoming displaced and interfering with the working of the valve or causing other injury, I fit the ends of the set-screws in sockets *u* and *v*, respectively, in the steam-chest and valve-seat. This set-screw may be employed in connection with either the lugs *l* or ribs *r*, as fully shown in Fig. 2 of the drawings.

It will be observed that either of the described constructions admits of a ready attachment and detachment of the valve-seat, which feature is the essential part of my invention, as by that means I am enabled to remove the worn or injured valve-seat from the cylinder and place it in a planer to reface it.

My improvement will be especially appreciated by superintendents of motive power on railways, inasmuch as valve seats of locomotives are subjected to excessive wear.

By keeping on hand a supply of extra valve-seats already planed to a templet a damaged seat can with the greatest facility be substituted by a perfect one, thus frequently saving expensive delays or stoppages of the use of the engine.

Having thus described my invention, what I claim is—

1. A valve-seat mounted loose on the cylinder-face inside of the steam-chest and confined in its position relative to the steam induction and eduction ports by lugs or shoulders, either on the cylinder-face or interior of the steam-chest, abutting against the ends of the loose seat, and a recess in the side of the steam-chest receiving the side of the valve-seat, substantially as shown and set forth.

2. The combination of the steam-chest, provided on its sides with the recess *n*, and the valve-seat mounted loose on the cylinder-face and having its sides extended into said recess, substantially as described and shown.

3. The combination of the steam-chest, provided on its sides with the recess *n*, and the valve-seat mounted loose on the cylinder-face and having its sides extended into said recess and its ends provided with lugs abutting against the end of the steam-chest, substantially as set forth.

4. In combination with a valve-seat mounted loose on the cylinder-face inside of the steam-chest, lugs or shoulders at opposite sides of the valve-seat, either on the cylinder-face or interior of the steam-chest, and a set-screw or key arranged to adjust said loose seat in its position, substantially as and for the purpose shown and set forth.

5. The valve-seat D, having steam and exhaust ports and mounted loose on the cylinder-face, and provided with flange *s*, in combination with lugs or shoulders, either on the cylinder-face or interior of the steam-chest, and having a flange engaging with that of the valve-seat, and a set-screw or key arranged to adjust it in its position, substantially as described.

6. The combination of the valve-seat D, mounted loose on the cylinder-face and provided with flange *s*, the rib *r*, attached to the cylinder-face, and the set-screw *e*, fitted in sockets *u* and *v*, respectively, in the end of the steam-chest and end of valve-seat, substantially as specified and shown.

In testimony whereof I have hereunto set my hand this 12th day of July, 1880.

HENRY WATKEYS.

Witnesses:
E. LAASS,
WM. C. RAYMOND.